March 15, 1955 — I. NESSON — 2,703,901
LOCKING CONNECTOR FOR WIPER BLADES
Filed June 16, 1951
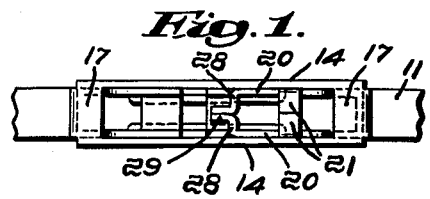
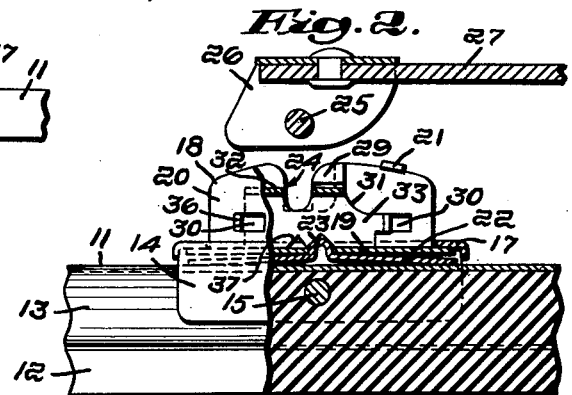
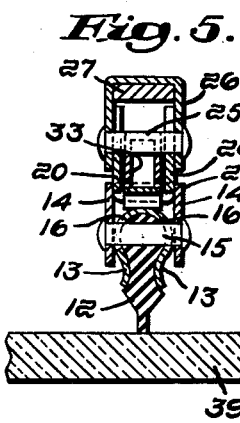
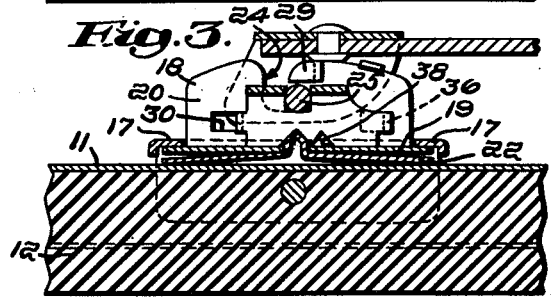
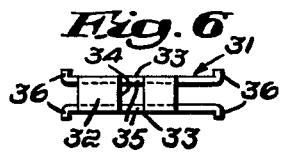
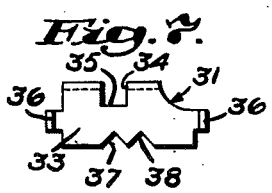
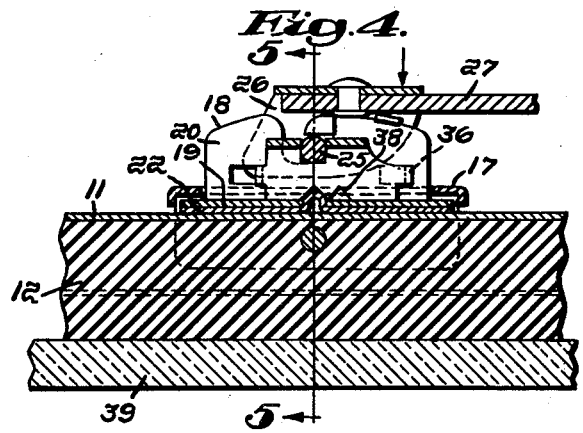
Inventor:
Israel Nesson,
by Thomson & Thomson
Attorneys

United States Patent Office 2,703,901
Patented Mar. 15, 1955

2,703,901

LOCKING CONNECTOR FOR WIPER BLADES

Israel Nesson, Lynn, Mass., assignor to Max Zaiger, Swampscott, Mass.

Application June 16, 1951, Serial No. 231,989

7 Claims. (Cl. 15—250)

This invention relates to connectors for separably attaching a windshield wiper arm to a wiper blade, and pertains more particularly to improvements in a connector or clip mounted on the wiper blade for releasably and pivotally connecting thereto a spring-pressed wiper arm having a cross pin or bar adjacent its end.

The principal purpose of the present invention is to provide a connector of this type which is of a simple and durable construction and of easy and efficient operation, and which readily receives the cross pin or bar carried by the end of the wiper arm and effectively locks the pin in the connector while the wiper is in operative position on the windshield and permits unlocking of the pin by relative movement of the connected parts when the pressure of the arm on the connector is released. As is commonly understood, commercial windshield wiper arms are customarily connected to the oscillating shaft of a wiper motor, and the arm is equipped with suitable spring means which normally urge the free end of the arm, and the blade carried thereby, toward the windshield with sufficient pressure for effective wiping action during reciprocation of the arm.

More specifically, it is an object of this invention to provide a wiper blade with a connector comprising a spring-locked gate member which is slidable longitudinally within a movable housing of the connector, the gate member being recessed to receive the cross bar of the arm, and the connector housing having a catch member under which said bar is locked upon movement of the gate member in one direction to locking position, and comprising a spring bearing on the blade and having a portion engageable with a complemental portion of the gate member to hold said member in its locking position, while the blade is pressed against the windshield by action of the spring-pressed arm.

Other advantageous features of the improved connector will be apparent from the following description of the recommended embodiment of the invention shown in the accompanying drawings, but it will be understood that the structural details of the devices herein illustrated and described may be varied to suit particular purposes or conditions without departing from the essence of this invention as defined in the appended claims. It will also be understood that the improved connector may be employed in windshield wipers for automotive, aircraft, or other uses, and that the precise structural elements of the wiper blade and wiper arm are not material to this invention.

In the drawings,

Fig. 1 is a fragmentary plan view of a wiper blade equipped with a preferred form of the improved connector;

Fig. 2 is a side elevation, partly broken away and in longitudinal section, of the blade and connector shown in Fig. 1, the gate member being in unlocking position, and also showing the end portion of a pin-type wiper arm in position to be applied to the connector;

Fig. 3 is a sectional view similar to Fig. 2, showing the gate member in bar-locking position and showing the cross pin or bar of the wiper arm pivotally connected to the wiper blade;

Fig. 4 is a view similar to Fig. 3, indicating the operative position of the spring-locked gate when the end of wiper arm and the blade are pressed toward the windshield by action of the spring-pressed arm, to secure the gate member in bar-locking position;

Fig. 5 is a transverse section on line 5—5 of Fig. 4.

Fig. 6 is a plan view of the gate member; and

Fig. 7 is a side elevation of the gate member.

In the particular embodiment chosen for the purpose of illustration, the improved connector is rockably mounted for restrained transverse tilting movement with respect to the wiper blade which comprises a channeled metal shell or holder 11, and a rubber wiper strip 12 gripped between the sides 13 of the shell.

The connector comprises a sub clip having sides 14 which straddle the sides of the blade holder or shell 11 and which are connected thereto by a rivet 15 or the like, passing through openings in said sides 14, through openings 16 in the holder sides 13, and through the portion of the rubber wiper 12 gripped by said holder sides. The sub clip has top members or abutments 17 at its opposite ends defining an elongate opening therebetween leading to a chamber between the sides 14 of the sub clip. The sub clip is generally similar to the sub clip disclosed in Zaiger Patent 2,234,791, dated March 11, 1941, and constitutes a preferred means for mounting the connector on the wiper blade.

A main clip or housing 18 of the connector is loosely attached to the sub clip in such a manner that the housing is moveable toward and from the top of the blade holder 11 and rockable angularly with respect to the sub clip, to permit tilting of the wiper blade in normal operation. Said housing comprises a base 19 received between the sides 14 and having end portions which underlie the abutments 17 of the sub clip, said abutments being spaced from the top of the holder 11. Parallel upstanding sides 20 of the housing extend through the opening in the top of the sub clip and are maintained in spaced relation by said base member and by inwardly directed spacing tongues 21 having their ends in abutting relation as shown in Fig. 1, at the top of the sides 18.

A leaf-spring 22 is disposed between the housing base 19 and the shell 11. The end portions of said spring normally bear against the shell, and the central portion of the spring has an upwardly deflected, transverse bight or detent 23 which projects through a transverse slot in said base 19, and engages complemental portions of the gate member as hereinafter explained.

The sides 20 of the housing 18 have complemental recesses 24 extending downwardly from the top thereof, to receive the cross pin or bar 25 carried by the end piece 26 of the wiper arm 27. Tab portions 28 of the sides 20 are bent inwardly into surface-abutting relation to provide a catch member 29 formed by the juxtaposed ends of said tabs, between the sides 20, and partially overlying the space or pocket defined by the recesses 24. The catch member 29 blocks the exit of such pocket when the gate member of the connector is in its locking position as hereafter described, thereby pivotally attaching the cross bar 25 to the connector.

For cooperation with the sliding gate member, each of the sides 20 of housing 18 has a pair of longitudinally spaced slots 30, the pairs of slots in the opposite sides 20 being complemental to each other. The bight or detent 23 of the spring 22 projects upwardly through a transverse slot in the base of the housing, as aforesaid, and said detent is preferably disposed between the respective pairs of side openings 30, substantially in the center of the connector.

The gate member 31 is received between the housing sides and is slidable longitudinally of the housing. As shown in Figs. 6 and 7, the gate is preferably formed of sheet metal bent into channel shape and comprises a top 32 and spaced, parallel depending sides 33. The top has a transverse slot or opening 34 and the sides have recesses or slots 35 communicating with said opening to provide a recess in the gate member for receiving the cross pin or bar 25 of the wiper arm, when the gate member is in unlocking position and the bar is placed in the recesses 24 of the housing 18. The opposite ends of each of the sides 33 have outwardly projecting guide tongues 36. These paired tongues are received and slide longitudinally of the housing in the respective pairs of guide slots 30, and constitute runners or keys for the sliding gate. The guide runners ensure that the gate slides parallel to the housing base, prevent relative transverse movement between the gate and the housing, and limit longitudinal sliding movement of the gate in both directions.

The gate is thus keyed to the housing for limited sliding movement parallel to the housing base 19. When the gate is slid to the limit of its movement to the left of the connector as shown in the drawing, it is in unlocking position with respect to the arm bar 25, as indicated in Fig. 2; when it is slid to the limit of its movement to the right of the connector, it is in bar-locking position, as shown in Figs. 3 and 4.

Each of the gate sides 33 has two longitudinally spaced, bottom notches 37 and 38, respectively, preferably disposed adjacent the longitudinal center of the gate member. These notches selectively receive the detent 23 of the spring 22, yieldingly to hold the gate member in either of its respective positions. The notches are defined by inclined edges of the gate sides and may be of triangular outline, as shown, so that the gate may be forcibly moved from unlocking to locking position, and vice versa, when the gate and housing are free to be depressed toward the blade, against the yielding resistance of the spring 22, as shown in Fig. 3. Such sliding movement of the gate may be effected manually by moving the arm and blade in opposite directions relative to each other while the cross bar 25 of the arm is disposed in the gate slots 35, for the notched gate will cam over the detent 23 of the spring 22 which is momentarily depressed during such movement.

When the gate is in bar-locking position and the connector housing and gate are depressed by action of the spring-pressed arm (indicated by the arrow of Fig. 4) to press the wiper strip 12 against the windshield 39, thereby flattening the spring 22 as shown in Fig. 4, the gate is positively locked against sliding movement relative to the housing by the engagement of the detent 23 of the unyieldable spring in the notches 38. Thus, the cross pin or bar 25 is positively latched to the connector and the wiper arm is securely attached to the wiper blade, as long as the blade is pressed against the windshield by the spring-pressed arm, while the wiper is at rest or in normal operation.

In order to permit detachment of the connected wiper parts, the arm is manually lifted to release pressure of the gate and housing base on the spring 22 and the gate is then manually slid to unlocking position (Fig. 2) as explained above. The arm may be reconnected by inserting the cross bar in the gate slots and moving the arm relative to the blade to slide the gate from the unlocking position to the bar-locking position (Fig. 3). It will be evident that the arm is thus releasably connected to the blade against accidental separation, even when the blade is not pressed against the windshield.

I claim:

1. A connector carried by a wiper blade for attaching the blade to a spring-pressed wiper arm having a cross bar adjacent its end, the connector comprising a housing having a base and spaced substantially parallel sides provided with complemental recesses defining a pocket for receiving said cross bar, the housing having a stationary catch member overhanging a portion of said pocket, a gate member keyed to said housing for sliding movement therein relative to said base, the gate having a bar-receiving slot and being movable to carry said slot to bar-locking and unlocking positions with respect to said catch member, the cross bar being receivable in said slot when the gate is in unlocking position and being disposed immediately beneath said catch member when the gate is in locking position, means connecting the housing to the wiper blade whereby the housing base may be moved toward and from the back of the blade, and resilient means disposed between said base and said back for yieldingly holding said base in spaced relation to said back, said resilient means and said gate member having mutually engageable elements for releasably holding the gate in either of its respective positions, said gate being locked in bar-locking position when the gate, the housing and the resilient means are depressed toward the blade back by normal action of the spring-pressed arm in pressing the blade against a windshield, the housing connecting means comprising a mounting fixed to the blade and having spaced abutments disposed in spaced relation to the blade back, the housing sides being disposed between said abutments and the housing base having end portions disposed intermediate the respective abutments and the blade back.

2. A connector carried by a wiper blade for attaching the blade to a spring-pressed wiper arm having a cross bar adjacent its end, the connector comprising a housing having a base and spaced substantially parallel sides provided with complemental recesses defining a pocket for receiving said cross bar, the housing having a stationary catch member overhanging a portion of said pocket, a gate member keyed to said housing for sliding movement therein relative to said base, the gate having a bar-receiving slot and being movable to carry said slot to bar-locking and unlocking positions with respect to said catch member, the cross bar being receivable in said slot when the gate is in unlocking position and being disposed immediately beneath said catch member when the gate is in locking position, means connecting the housing to the wiper blade whereby the housing base may be moved toward and back of the blade, and resilient means disposed between said base and said back for yieldingly holding said base in spaced relation to said back, said resilient means and said gate member having mutually engageable elements for releasably holding the gate in either of its respective positions, said gate being locked in bar-locking position when the gate, the housing and the resilient means are depressed toward the blade back by normal action of the spring-pressed arm in pressing the blade against a windshield, the housing connecting means comprising a mounting fixed to the blade and having spaced abutments disposed in spaced relation to the blade back, the housing sides being disposed between said abutments and the housing base having end portions disposed intermediate the respective abutments and the blade back, the housing sides and the gate member having mutually interfitting elements for keying the gate to the housing and for guiding and limiting the sliding movement of the gate in the housing.

3. A connector carried by a wiper blade for attaching the blade to a spring-pressed wiper arm having a cross bar adjacent its end, the connector comprising a housing having a base and spaced substantially parallel sides provided with complemental recesses defining a pocket for receiving said cross bar, the housing having a stationary catch member overhanging a portion of said pocket, a gate member keyed to said housing for sliding movement therein relative to said base, the gate having a bar-receiving slot and being movable to carry said slot to bar-locking and unlocking positions with respect to said catch member, the cross bar being receivable in said slot when the gate is in unlocking position and being disposed immediately beneath said catch member when the gate is in locking position, means connecting the housing to the wiper blade whereby the housing base may be moved toward and from the back of the blade, and resilient means disposed between said base and said back for yieldingly holding said base in spaced relation to said back, said resilient means and said gate member having mutually engageable elements for releasably holding the gate in either of its respective positions, said gate being locked in bar-locking position when the gate, the housing and the resilient means are depressed toward the blade back by normal action of the spring-pressed arm in pressing the blade against a windshield, the housing connecting means comprising a mounting fixed to the blade and having spaced abutments disposed in spaced relation to the blade back, the housing sides being disposed between said abutments and the housing base having end portions disposed intermediate the respective abutments and the blade back, the resilient means consisting of a leaf spring having a projection constituting the detent, the housing base having an opening through which the detent projects, and the gate member having at least one notch engageable with said projecting detent, said spring being substantially flattened and unyielding when the gate and housing are depressed by the spring-pressed arm.

4. A connector carried by a wiper blade for separably and pivotally attaching the blade to a spring-pressed wiper arm having a cross bar adjacent its end, the connector comprising a housing having a base and transversely spaced substantially parallel sides provided with complemental recesses forming a pocket for receiving said cross bar, the housing having a stationary catch member overhanging a portion of said pocket, a gate member keyed to the housing for longitudinal sliding movement parallel to its base and between its sides, the gate member having a bar-receiving slot and being movable to unlocking position at which the cross bar may be received in said pocket and slot and to bar-locking position at which said notch and the cross bar received therein are disposed immediately beneath said catch member and in operative relation thereto to secure the cross bar between the catch member and the slotted gate, means for mounting the housing on the back of the blade, said means comprising a sub slip having a pair of longitudinally spaced abutments fixed in spaced relation with respect to the blade back, the housing being disposed between said abutments and the housing base having projecting end portions disposed intermediate the respective abutments and the blade back and movable therebetween, whereby said base is movable toward and from said back, and a spring disposed between said base and said back and normally pressing said base ends against said abutments to restrain said movement, said base having a transverse opening intermediate its ends and the spring having a detent projecting through said opening, and said gate member having longitudinally spaced notches selectively engageable by said detent, whereby the gate member is yieldingly held in its bar-locking and unlocking positions respectively, said gate being positively locked in bar-locking position when the gate, the housing and the spring are depressed toward the blade back by normal action of the spring-pressed arm in pressing the blade against a windshield.

5. A connector as described in claim 4, the housing sides having longitudinal slots therethrough and the gate member having runners slidable in said slots for guiding and limiting sliding movement of the gate in the housing.

6. A connector as described in claim 4, said spring consisting of a leaf having end portions bearing on the blade back and having a transverse bight in its central portion constituting said detent, and said gate having inclined edges defining said notches and adapted to ride over said detent when the undepressed gate is slid from one position to the other by relative manual movement of the arm and blade.

7. A connector as described in claim 4, the housing sides having longitudinal slots therethrough and the gate having outwardly projecting tongues slidable in the respective slots and constituting runners for keying the gate to the housing and for guiding and limiting sliding movement of the gate, said spring consisting of a leaf having end portions bearing on the blade back and having a transverse bight intermediate said end portions, and said gate having inclined edges defining said notches and constituting cam surfaces adapted to ride over and momentarily depress the spring when the undepressed gate is slid from one position to the other by relative manual movement of the arm and blade.

References Cited in the file of this patent

UNITED STATES PATENTS

| | | |
|---|---|---|
| 1,546,950 | Stuart | July 21, 1925 |
| 2,156,506 | Marcolivio | May 2, 1939 |
| 2,432,689 | Smulski | Dec. 16, 1947 |
| 2,432,693 | Anderson | Dec. 16, 1947 |